United States Patent
Benjamin et al.

(10) Patent No.: US 10,309,252 B2
(45) Date of Patent: Jun. 4, 2019

(54) SYSTEM AND METHOD FOR COOLING TURBINE SHROUD TRAILING EDGE

(71) Applicant: General Electric Company, Schenectady, NY (US)

(72) Inventors: Marc Lionel Benjamin, Taylors, SC (US); Benjamin Paul Lacy, Greer, SC (US); Dipankar Pal, Greenville, SC (US); San Jason Nguyen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 14/971,478

(22) Filed: Dec. 16, 2015

(65) Prior Publication Data

US 2017/0175573 A1    Jun. 22, 2017

(51) Int. Cl.
*F01D 25/12* (2006.01)
*F01D 9/00* (2006.01)
(Continued)

(52) U.S. Cl.
CPC ............... *F01D 25/12* (2013.01); *F01D 9/00* (2013.01); *F01D 9/04* (2013.01); *F01D 11/08* (2013.01);
(Continued)

(58) Field of Classification Search
CPC ... F01D 9/04; F01D 9/00; F01D 11/08; F01D 25/246; F02C 3/04
See application file for complete search history.

(56) References Cited

U.S. PATENT DOCUMENTS 4,490,773 A    12/1984  Mofatt
5,586,859 A *  12/1996  Nolcheff .................. F01D 11/08
                                                415/173.1
(Continued)

FOREIGN PATENT DOCUMENTS

EP    1 517 008 A2    3/2005
EP    2 894 301 A1    7/2015
EP    3 156 608 A1    4/2017

OTHER PUBLICATIONS

U.S. Appl. No. 14/971,383, filed Dec. 16, 2015, Marc Lionel Benjamin.
(Continued)

*Primary Examiner* — Craig Kim
(74) *Attorney, Agent, or Firm* — Charlotte C. Wilson; Frank A. Landgraff

(57) ABSTRACT

A shroud segment that includes a body including a leading edge, a trailing edge, a first side edge, a second side, and a pair of opposed lateral sides. A first lateral side is configured to interface with a cavity having a cooling fluid, and a second lateral side is oriented toward a hot gas flow path. The shroud segment includes at least one channel disposed within the body, wherein the at least one channel includes a first portion extending from upstream of the trailing edge towards the trailing edge in a first direction from the leading edge to the trailing edge, a second portion extending from the trailing edge to upstream of the trailing edge in a second direction from the trailing edge to the leading edge, and a third portion extending from upstream of the trailing edge towards the trailing edge in the first direction.

17 Claims, 8 Drawing Sheets

(51) Int. Cl.
*F02C 3/04* (2006.01)
*F01D 9/04* (2006.01)
*F01D 11/08* (2006.01)
*F01D 25/24* (2006.01)

(52) U.S. Cl.
CPC ............. *F01D 25/246* (2013.01); *F02C 3/04* (2013.01); *F05D 2230/12* (2013.01); *F05D 2230/237* (2013.01); *F05D 2240/11* (2013.01); *F05D 2250/185* (2013.01); *F05D 2260/204* (2013.01); *Y02T 50/676* (2013.01)

(56) References Cited

U.S. PATENT DOCUMENTS

| | | | |
|---|---|---|---|
| 5,829,245 | A | 11/1998 | McQuiggan et al. |
| 6,113,553 | A | 9/2000 | Chubbuck |
| 6,241,467 | B1* | 6/2001 | Zelesky ............... F01D 5/187 415/115 |
| 6,278,379 | B1 | 8/2001 | Allen et al. |
| 6,431,005 | B1 | 8/2002 | Delaye |
| 6,890,300 | B2 | 5/2005 | Lloyd et al. |
| 7,089,790 | B2 | 8/2006 | Silverbrook et al. |
| 7,089,798 | B2 | 8/2006 | Silverbrook et al. |
| 7,240,560 | B2 | 7/2007 | Silverbrook et al. |
| 7,258,020 | B2 | 8/2007 | Silverbrook et al. |
| 7,260,995 | B2 | 8/2007 | Silverbrook et al. |
| 7,284,954 | B2 | 10/2007 | Parker et al. |
| 7,306,424 | B2 | 12/2007 | Romanov et al. |
| 7,334,480 | B2 | 2/2008 | Silverbrook et al. |
| 7,350,417 | B2 | 4/2008 | Silverbrook et al. |
| 7,464,599 | B2 | 12/2008 | Silverbrook et al. |
| 7,510,370 | B2 | 3/2009 | Strangman et al. |
| 7,513,040 | B2 | 4/2009 | Cunha et al. |
| 7,553,128 | B2 | 6/2009 | Abdel-Messeh et al. |
| 7,597,533 | B1 | 10/2009 | Liang |
| 7,621,719 | B2 | 11/2009 | Lutjen et al. |
| 7,653,994 | B2 | 2/2010 | Dasilva et al. |
| 7,699,059 | B2 | 4/2010 | Fonseca et al. |
| 7,770,469 | B2 | 8/2010 | Nyfors et al. |
| 7,854,170 | B2 | 12/2010 | Silverbrook et al. |
| 7,900,458 | B2 | 3/2011 | James et al. |
| 8,061,979 | B1* | 11/2011 | Liang ................. F01D 11/08 415/173.1 |
| 8,449,246 | B1 | 5/2013 | Liang |
| 8,556,575 | B2 | 10/2013 | Knapp et al. |
| 8,647,053 | B2 | 2/2014 | Hsu et al. |
| 8,727,704 | B2 | 5/2014 | Lee et al. |
| 8,870,523 | B2 | 10/2014 | Kottilingam et al. |
| 8,876,458 | B2 | 11/2014 | Thibodeau et al. |
| 8,894,352 | B2 | 11/2014 | Berrong et al. |
| 8,998,572 | B2 | 4/2015 | Lutjen et al. |
| 9,017,012 | B2 | 4/2015 | Brunelli et al. |
| 9,127,549 | B2 | 9/2015 | Lacy et al. |
| 2005/0187482 | A1 | 8/2005 | O'Brien et al. |
| 2007/0090926 | A1 | 4/2007 | Potyrailo et al. |
| 2007/0090927 | A1 | 4/2007 | Potyrailo et al. |
| 2011/0051775 | A1 | 3/2011 | Ivanov et al. |
| 2011/0320142 | A1 | 12/2011 | Surman et al. |
| 2012/0114868 | A1 | 5/2012 | Bunker et al. |
| 2012/0124832 | A1 | 5/2012 | Bunker et al. |
| 2017/0122109 | A1 | 5/2017 | Bunker et al. |

OTHER PUBLICATIONS

U.S. Appl. No. 14/971,585, filed Dec. 16, 2015, Marc Lionel Benjamin.

U.S. Appl. No. 14/971,674, filed Dec. 16, 2015, Marc Lionel Benjamin.

U.S. Appl. No. 14/971,724, filed Dec. 16, 2015, Marc Lionel Benjamin.

Artmann, R., "Electronic identification systems: state of the art and their further development," vol. 24, Issue. 1-2, pp. 5-26 (Nov. 1999) (Abstract).

Nicolaou, K.C., et al., "Radiofrequency Encoded Combinatorial Chemistry," vol. 34, Issue. 20, pp. 2289-2291 (Nov. 3, 1995) (Abstract).

Potyrailo, R.A., et al., "Multianalyte Chemical Identification and Quantitation Using a Single Radio Frequency Identification Sensor," Materials Analysis and Chemical Sciences, vol. 79 Issues. 1, pp. 45-51 (Nov. 30, 2006) (Abstract).

Roberti, M., "A 5-Cent Breakthrough", Retrieved from the Internet URL: http://www.rfidjournal.com/article/articleview/2295, on Jan. 8, 2018, pp. 2 (May 2006).

Surman, C., et al., "Temperature-independent passive RFID pressure sensors for single-use bioprocess components," IEEE International Conference on RFID, pp. 1-3 (Apr. 12-14, 2011) (Abstract).

Want, R., "Enabling ubiquitous sensing with RFID," Computer, vol. 37, Issue. 4, pp. 84-86 (Aug. 2, 2004) (Abstract).

Extended European Search Report and Opinion issued in connection with corresponding EP Application No. 16201973.1 dated May 11, 2017.

* cited by examiner

SYSTEM AND METHOD FOR COOLING TURBINE SHROUD TRAILING EDGE

BACKGROUND

The subject matter disclosed herein relates to gas turbine engines, and more specifically, to turbine shrouds for gas turbine engines.

A turbomachine, such as a gas turbine engine, may include a compressor, a combustor, and a turbine. Gases are compressed in the compressor, combined with fuel, and then fed into to the combustor, where the gas/fuel mixture is combusted. The high temperature and high energy exhaust fluids are then fed to the turbine along a hot gas path, where the energy of the fluids is converted to mechanical energy. High temperatures along the hot gas path can heat turbine components (e.g., turbine shroud), causing degradation of components.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a shroud segment for use in a turbine section of a gas turbine engine is provided. The shroud segment includes a body including a leading edge, a trailing edge, a first side edge, a second side, and a pair of opposed lateral sides between the leading and trailing edges and the first and second side edges. A first lateral side of the pair of opposed lateral sides is configured to interface with a cavity having a cooling fluid, and a second lateral side of the pair of opposed lateral sides is oriented toward a hot gas flow path. The shroud segment also includes at least one channel disposed within the body on the second lateral side adjacent the trailing edge, wherein the at least one channel includes a first portion extending from upstream of the trailing edge towards the trailing edge in a first direction from the leading edge to the trailing edge, a second portion extending from the trailing edge to upstream of the trailing edge in a second direction from the trailing edge to the leading edge, and a third portion extending from upstream of the trailing edge towards the trailing edge in the first direction. The at least one channel is configured to receive the cooling fluid from the cavity to cool the trailing edge.

In accordance with a second embodiment, a gas turbine engine is provided. The gas turbine engine includes a compressor, a combustion system, and a turbine section. The turbine section includes an outer casing, an outer shroud segment coupled to the outer casing, and an inner shroud segment coupled to the outer shroud segment to form a cavity configured to receive a cooling fluid from the compressor. The inner shroud segment includes a body having a leading edge, a trailing edge, a first side edge, a second side edge, and a pair of opposed lateral sides between the leading and trailing edges and the first and second side edges. A first lateral side of the pair of opposed lateral sides is configured to interface with the cavity, and a second lateral side of the pair of opposed lateral sides is oriented toward a hot gas flow path. The inner shroud segment includes multiple channels disposed within the body on the second lateral side adjacent the trailing edge, wherein each channel is arranged in a serpentine pattern. The multiple channels are configured to receive the cooling fluid from the cavity to cool the trailing edge.

In accordance with a third embodiment, a shroud segment for use in a turbine section of a gas turbine engine is provided. The shroud segment includes a body including a leading edge, a trailing edge, a first side edge, a second side, and a pair of opposed lateral sides between the leading and trailing edges and the first and second side edges. A first lateral side of the pair of opposed lateral sides is configured to interface with a cavity having a cooling fluid, and a second lateral side of the pair of opposed lateral sides is oriented toward a hot gas flow path. The shroud segment also includes multiple channels disposed within the body on the second lateral side adjacent the trailing edge, wherein each channel is arranged in a serpentine pattern and each channel includes a free end disposed upstream of the trailing edge. The shroud segment further includes multiple inlet passages. A respective inlet passage of the multiple inlet passages is coupled to a respective free end of a respective channel of the multiple channels upstream from the trailing edge, wherein the respective inlet passage extends from the respective free end to the first lateral side, and the respective inlet passage is configured to provide the cooling fluid from the cavity to the respective channel to cool the trailing edge.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
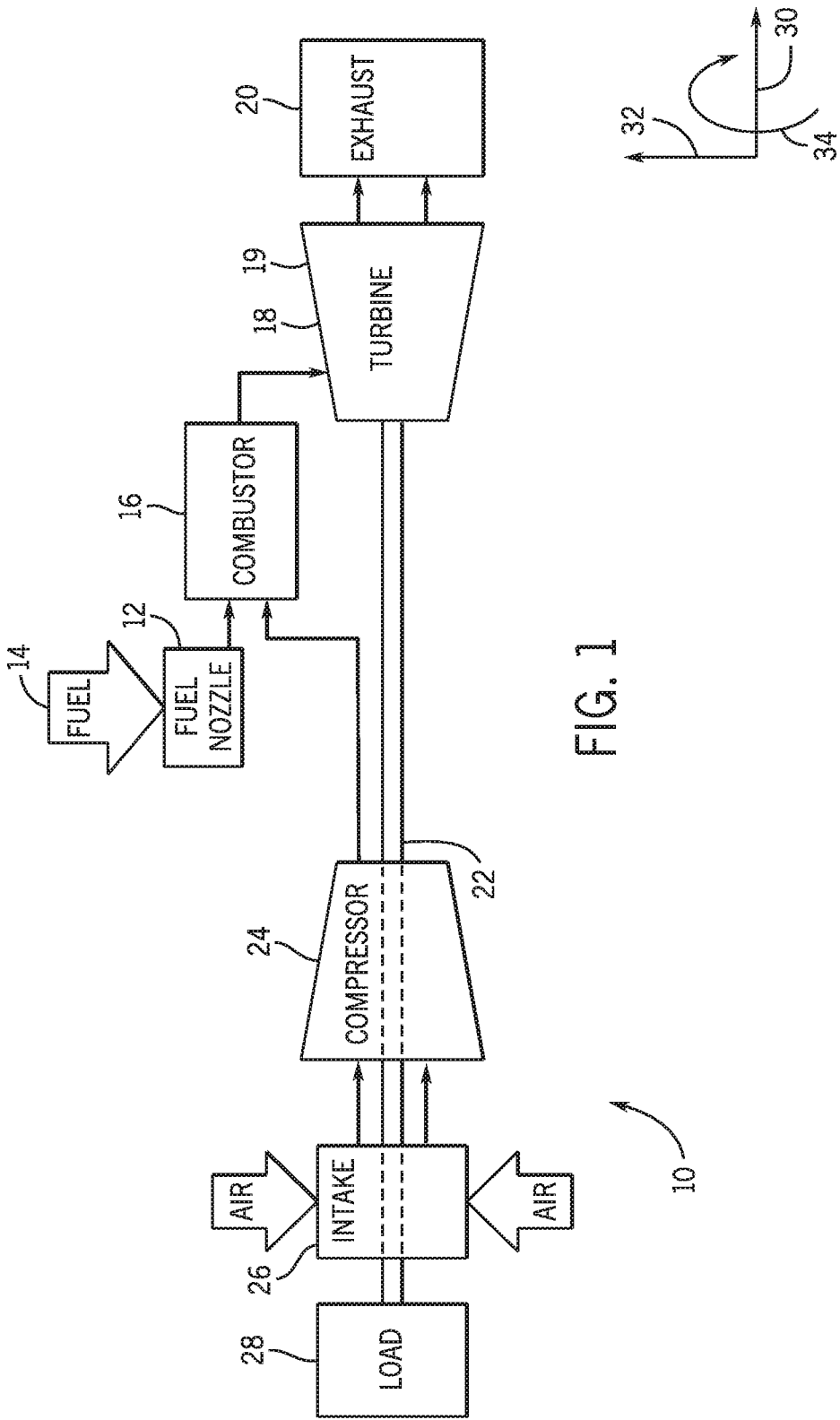
FIG. 1 is a block diagram of an embodiment of a turbine system having a turbine shroud with cooling channels.

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for cooling components of a turbine (e.g., turbine shroud) disposed along a hot gas flow path. In particular, an inner turbine shroud segment includes a body that includes near surface channels (e.g., micro-channels) disposed on a lateral side oriented toward the hot gas flow path. In certain embodiments, the channels are disposed adjacent the trailing edge of the body. A pre-sintered preform layer disposed over (e.g., brazed on) the lateral side with the channels together with the body defines the channels. Each channel includes a first portion extending from upstream of the trailing edge towards the trailing edge in a first direction from a leading edge of the body to the trailing edge, a second portion extending from the trailing edge to upstream of the trailing edge in a second direction from the trailing edge to the leading edge, and a third portion extending from upstream of the trailing edge towards the trailing edge in the first direction. In certain embodiments, the first, second, and third portions are coupled via curved portions. In certain embodiments, each channel adjacent the trailing edge may be arranged in serpentine pattern. The channels adjacent the trailing edge are configured to receive a cooling fluid (e.g., discharge air or post-impingement air from a compressor) from a cavity (e.g., bathtub) defined by the inner turbine shroud segment and an outer turbine shroud segment coupled to the inner turbine shroud segment via inlet passages coupled to respective free ends of the first portions of the channels that extend to a lateral side of the inner turbine shroud segment that interfaces with the cavity (i.e., the lateral side opposite the lateral side oriented toward the hot gas flow path). The channels discharge the cooling fluid (e.g., spent cooling fluid) from the trailing edge of the body via respective free ends of the third portion of the channels. The shape of the channels provide a larger cooling region (e.g., larger than typical cooling systems for turbine shrouds) adjacent the trailing edge while keeping flow at a minimum. The shape of the channels is also optimized to provide adequate cooling in the event of plugged channels. The disclosed embodiments of the inner turbine shroud segment may enable cooling of the inner turbine shroud segment with less air (e.g., than typical cooling systems for turbine shrouds) resulting in reduced costs associated with chargeable air utilized in cooling.

Turning to the drawings, FIG. 1 is a block diagram of an embodiment of a turbine system 10. As described in detail below, the disclosed turbine system 10 (e.g., a gas turbine engine) may employ a turbine shroud having cooling channels, described below, which may reduce the stress modes in the hot gas path components and improve the efficiency of the turbine system 10. The turbine system 10 may use liquid or gas fuel, such as natural gas and/or a hydrogen rich synthetic gas, to drive the turbine system 10. As depicted, fuel nozzles 12 intake a fuel supply 14, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 12 distribute the fuel-air mixture into a combustor 16 in a suitable ratio for optimal combustion, emissions, fuel consumption, and power output. The turbine system 10 may include one or more fuel nozzles 12 located inside one or more combustors 16. The fuel-air mixture combusts in a chamber within the combustor 16, thereby creating hot pressurized exhaust gases. The combustor 16 directs the exhaust gases (e.g., hot pressurized gas) through a transition piece into a turbine nozzle (or "stage one nozzle"), and other stages of buckets (or blades) and nozzles causing rotation of a turbine 18 within a turbine casing 19 (e.g., outer casing). The exhaust gases flow toward an exhaust outlet 20. As the exhaust gases pass through the turbine 18, the gases force turbine buckets (or blades) to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. A portion of the compressed air (e.g., discharged air) from the compressor 24 may be diverted to the turbine 18 or its components without passing through the combustor 16. The discharged air (e.g., cooling fluid) may be utilized to cool turbine components such as shrouds and nozzles on the stator, along with buckets, disks, and spacers on the rotor. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10. The turbine system 10 may extend along an axial axis or direction 30, a radial direction 32 toward or away from the axis 30, and a circumferential direction 34 around the axis 30. In an embodiment, hot gas path components (e.g., turbine shroud, nozzle, etc.) are located in the turbine 18, where hot gases flow across the components causing creep, oxidation, wear, and thermal fatigue of the turbine components. The turbine 18 may include one or more turbine shroud segments (e.g., inner turbine shroud segments) having a cooling passages (e.g., near surface micro-channels) to enable control of the temperature of the hot gas path components (e.g., utilizing less cooling air than typical cooling systems for shrouds) to reduce distress modes in the components, to extend service life of the components (while performing their intended functions), reduce costs associated with operating the turbine system 10, and to improve the efficiency of the gas turbine system 10.

Figure 2:
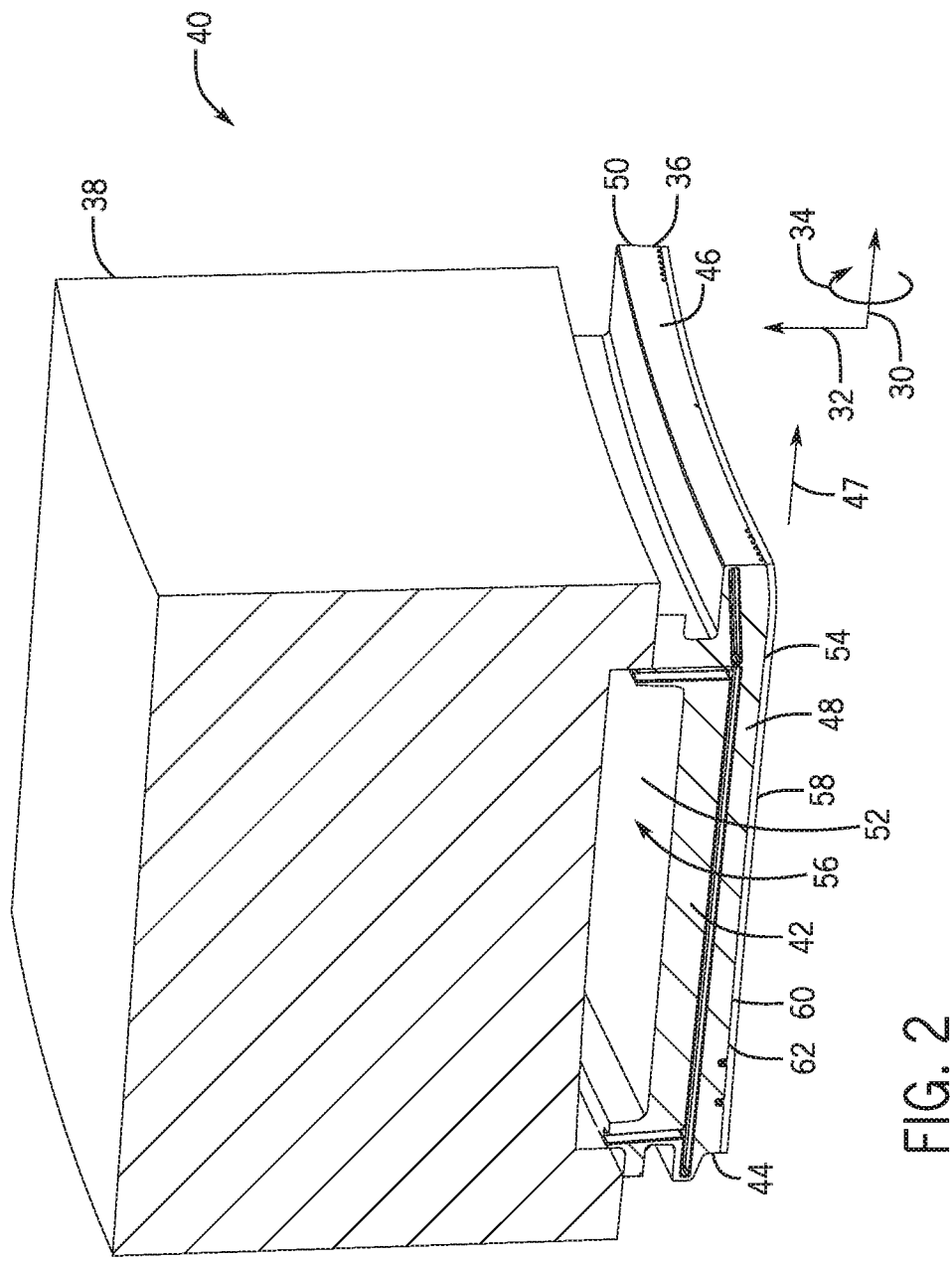
FIG. 2 is a perspective view of an embodiment of an inner turbine shroud segment coupled to an outer turbine shroud segment.

FIG. 2 is a perspective view of an embodiment of an inner turbine shroud segment 36 coupled to an outer turbine shroud segment 38 to form a turbine shroud segment 40. The turbine 18 includes multiple turbine shroud segments 40 that together form a respective ring about respective turbine stages. In certain embodiments, the turbine 18 may include multiple inner turbine shroud segments 36 coupled to respective outer turbine shroud segments 38 for each turbine shroud segment 40 disposed in the circumferential direction 34 about a rotational axis of the turbine 18 (and a turbine stage). In other embodiments, the turbine 18 may include multiple inner turbine shroud segments 38 coupled to the outer turbine shroud segment 38 to form the turbine shroud segment 40.

As depicted, the inner turbine shroud segment 40 includes a body 42 having an upstream or leading edge 44 and a downstream or trailing edge 46 that both interface with a hot gas flow path 47. The body 42 also includes a first side edge 48 (e.g., first slash face) and a second side edge 50 (e.g., second slash face) disposed opposite the first side edge 48 both extending between the leading edge 44 and the trailing edge 46. The body 42 further includes a pair of opposed lateral sides 52, 54 extending between the leading and trailing edges 44, 46 and the first and second side edges 48, 50. In certain embodiments, the body 42 (particularly, lateral sides 52, 54) may be arcuate shaped in the circumferential direction 34 between the first and second side edges 48, 50 and/or in the axial direction 30 between the leading and trailing edges 44, 46. The lateral side 52 is configured to interface with a cavity 56 defined between the inner turbine shroud segment 36 and the outer turbine shroud segment 38. The lateral side 54 is configured to be oriented toward the hot gas flow path 47 within the turbine 18.

As described in greater detail below, the body 42 may include multiple channels (e.g., cooling channels or microchannels) disposed within the lateral side 54 to help cool the hot gas flow path components (e.g., turbine shroud 40, inner turbine shroud segment 36, etc.). In certain embodiments, some of these channels are disposed adjacent the trailing edge 46 with or without other channels disposed within the lateral side on other portions of the body 42. A pre-sintered preform (PSP) layer 58 may be disposed on (e.g., brazed onto) the lateral side 54 so that a first surface 60 of the PSP layer 58 together with the body 42 defines (e.g., enclose) the channels and a second surface 62 of the PSP layer 58 interfaces with the hot gas flow path 47. The PSP layer 58 may be formed of superalloys and brazing material. In certain embodiments, as an alternative to the PSP layer 58 a non-PSP metal sheet may be disposed on the lateral side 54 that together with the body 42 defines the channels. In certain embodiments, the channels may be cast entirely within the body 42 near the lateral side 54. In certain embodiments, as an alternative to the PSP layer 58, a barrier coating or thermal barrier coating bridging may be utilized to enclose the channels within the body 42.

In certain embodiments, the body 42 includes hook portions to enable coupling of the inner turbine shroud turbine segment 36 to the outer turbine shroud segment 38. As mentioned above, the lateral side 52 of the inner turbine shroud segment 36 and the outer turbine shroud segment 38 define the cavity 56. The outer turbine shroud segment 38 is generally proximate to a relatively cool fluid or air (i.e., cooler than the temperature in the hot gas flow path 47) in the turbine 18 from the compressor 24. The outer turbine shroud segment 38 includes a passage (not shown) to receive the cooling fluid or air from the compressor 24 that provides the cooling fluid to the cavity 56. As described in greater detail below, the cooling fluid flows to the channels within the body 42 of the inner turbine shroud segment 36 via inlet passages disposed within the body 42 extending from the lateral side 52 to the channels. Each channel (disposed in areas not adjacent the trailing edge) includes a first end portion that includes a hook-shaped portion having a free end and a second end portion. The second end portion may include a metering feature (e.g., a portion of the body 42 extending into the channel that narrows a cross-sectional area of a portion of the channel relative to an adjacent cross-sectional area of the channel) to regulate flow of the cooling fluid within the channel. In certain embodiments, each channel itself (excluding the second end portion) acts as a metering feature (e.g., includes a portion of the body 42 extending into the channel). In other embodiments, inlet passages coupled to the hook-shaped portion may include a metering feature (e.g., portion of the body 42 extending into the inlet passage). In certain embodiments, the channel itself, the second end portion, or the inlet passage, or a combination thereof includes a metering feature. In addition, the cooling fluid exits the channels (and the body 42) via the second end portions at the first side edge 48 and/or the second side edge 50. In certain embodiments, the channels may be arranged in an alternating pattern with a channel having the first end portion disposed adjacent the first side edge 48 and the second end portion disposed adjacent the second side edge 50, while an adjacent channel has the opposite orientation (i.e., the first end portion disposed adjacent the second side edge 50 and the second end portion disposed adjacent the first side edge 48). The hook-shaped portions of the channels provide a larger cooling region (e.g., larger than typical cooling systems for turbine shrouds) by increasing a length of cooling channel adjacent the slash faces while keeping flow at a minimum. In addition, the hook-shaped portion enables better spacing of the straight portions of the channels. In certain embodiments, the body 42 includes channels disposed adjacent the trailing edge 46 that are shaped different from the channels disposed on the rest of the body 42. For example, the channels adjacent the trailing edge 46 (which will be described in greater detail below) may each include a serpentine pattern. The shape of the channels is also optimized to provide adequate cooling in the event of plugged channels. The disclosed embodiments of the inner turbine shroud segment may enable cooling of the inner turbine shroud segment with less air (e.g., than typical cooling systems for turbine shrouds) resulting in reduced costs associated with regards to chargeable air utilized in cooling.

Figure 3:
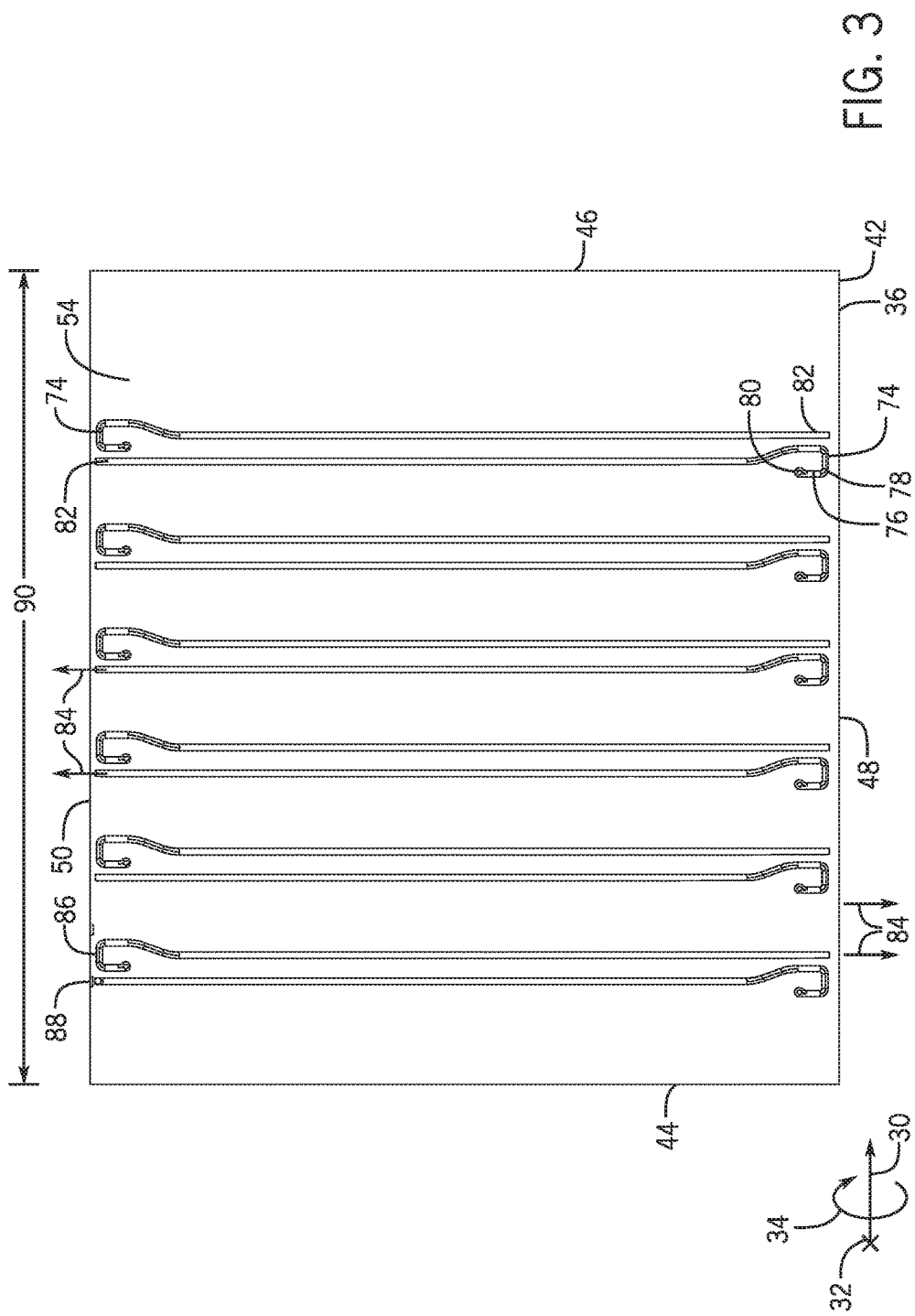
FIG. 3 is a bottom view (e.g., view of lateral side that is oriented toward a hot gas flow path) of an embodiment of an inner turbine shroud segment.

FIG. 3 is a bottom view (e.g., view of the lateral side 54 of the body 42 that is oriented toward the hot gas flow path) of an embodiment of the inner turbine shroud segment 36 without the PSP layer 58. As depicted, the body 42 includes a plurality of channels 74 (e.g., cooling channels or microchannels) disposed within the lateral side 54. The body 42 may include 2 to 40 or more channels 74 (as depicted, the body 42 includes 12 channels 74). Each channel 74 is configured to receive a cooling fluid from the cavity 56. Each channel 74 includes a first end portion 76 that includes a hook-shaped portion 78 having a free end 80. Each hook-shaped portion 78 has a hook turn radius ranging from approximately 0.05 to 4 millimeters (mm), 0.1 to 3 mm, 1.14 to 2.5 mm, and all subranges therebetween. As described in greater detail below, the free end 80 of each hook-shaped portion 78 is coupled to inlet passages that enable the channels 74 to receive the cooling fluid from the cavity 56. The curvature of the hook-shaped portion 78 enables more channels 74 to be disposed within the lateral side 54. In addition, the hook-shaped portion 78 provide a larger cooling region (e.g., larger than typical cooling systems for turbine shrouds) by increasing a length of cooling channel 74 adjacent the side edges 48, 50 while keeping flow at a minimum. In addition, the hook-shaped portion 78 enables better spacing of the straight portions of the channels 74. Further, the turning back of the hook-shaped portion 78 enables the straight portions of the channels to be uniformly distant from an adjacent channel to cool the main portion of the body 42 of the shroud segment 36. In certain embodiments, the hook-shaped portion 78 could be adjusted to enable the spacing of the straight portions of the channels 74 to be tighter packed for higher heat load zones. Overall, the shape of the channels 74 is also optimized to provide adequate cooling in the event of plugged channels 74. Each channel 74 also includes a second end portion 82 that enables the spent cooling fluid to exit the body 42 via the side edges 48, 50 via exit holes as indicated by the arrows 84. In certain embodiments, the second end portion 82 includes a metering feature configured to regulate (e.g., meter) a flow of the cooling fluid within the respective channel 74. In certain embodiments, each channel 74 may form a segmented channel at the second end portion 82. In particular, a bridge portion of the body 42 may extend across each channel 74 (e.g., in a direction from the leading edge 44 to the trailing edge 46) within the second end portion 82 with a portion of the channel 74 upstream of the bridge portion and a portion of the channel 74 downstream of the bridge portion. A passage may extend underneath the bridge portion fluidly connecting the portions of the channel 74 upstream and downstream of the bridge portion. In certain embodiments, each channel 74 itself (excluding the second end portion 82) acts as a metering feature (e.g., includes a portion of the body 42 extending into the channel). In other embodiments, inlet passages coupled to the hook-shaped portion 78 may include a metering feature (e.g., portion of the body 42 extending into the inlet passage). In certain embodiments, the channel 74 itself, the second end portion 82, or the inlet passage, or a combination thereof includes a metering feature.

As depicted, some of the channels 74 (e.g., channel 86) include the hook-shaped portion 78 of the first end portion 76 disposed adjacent the side edge 50 and the second end portion 82 disposed adjacent the side edge 48, while some of the channels 74 (e.g., channel 88) include the hook-shaped portion 78 of the first end portion 76 disposed adjacent the side edge 48 and the second end portion 82 disposed adjacent the side edge 50. In certain embodiments, the channels 74 are disposed in an alternating pattern (e.g., channels 86, 88) with one channel 74 having the hook-shaped portion 78 disposed adjacent one side edge 48 or 50 and the second end portion 82 (e.g., in certain embodiments having the metering feature) disposed adjacent the opposite side edge 48 or 50 with the adjacent channel 74 having the opposite orientation. As depicted, the channels 74 extend between the side edges 48, 50 from adjacent the leading edge 44 to adjacent the trailing edge 46. In certain embodiments, the channels 74 may extend between the side edges 48, 50 covering approximately 50 to 90 percent, 50 to 70 percent, 70 to 90 percent, and all subranges therein, of a length 90 of the body 42 between the leading edge 44 and trailing edge 46. For example, the channels 74 may extend between the side edges 48, 50 covering approximately 50, 55, 60, 65, 70, 75, 80, 85, or 90 percent of the length 90. This enables cooling along both of the side edges 48, 50 as well as cooling across a substantial portion of the body 42 (in particular, the lateral side 54 that is oriented toward the hot gas flow path 47) between both the leading edge 44 and the trailing edge 46 and the side edges 48, 50.

Figure 4:
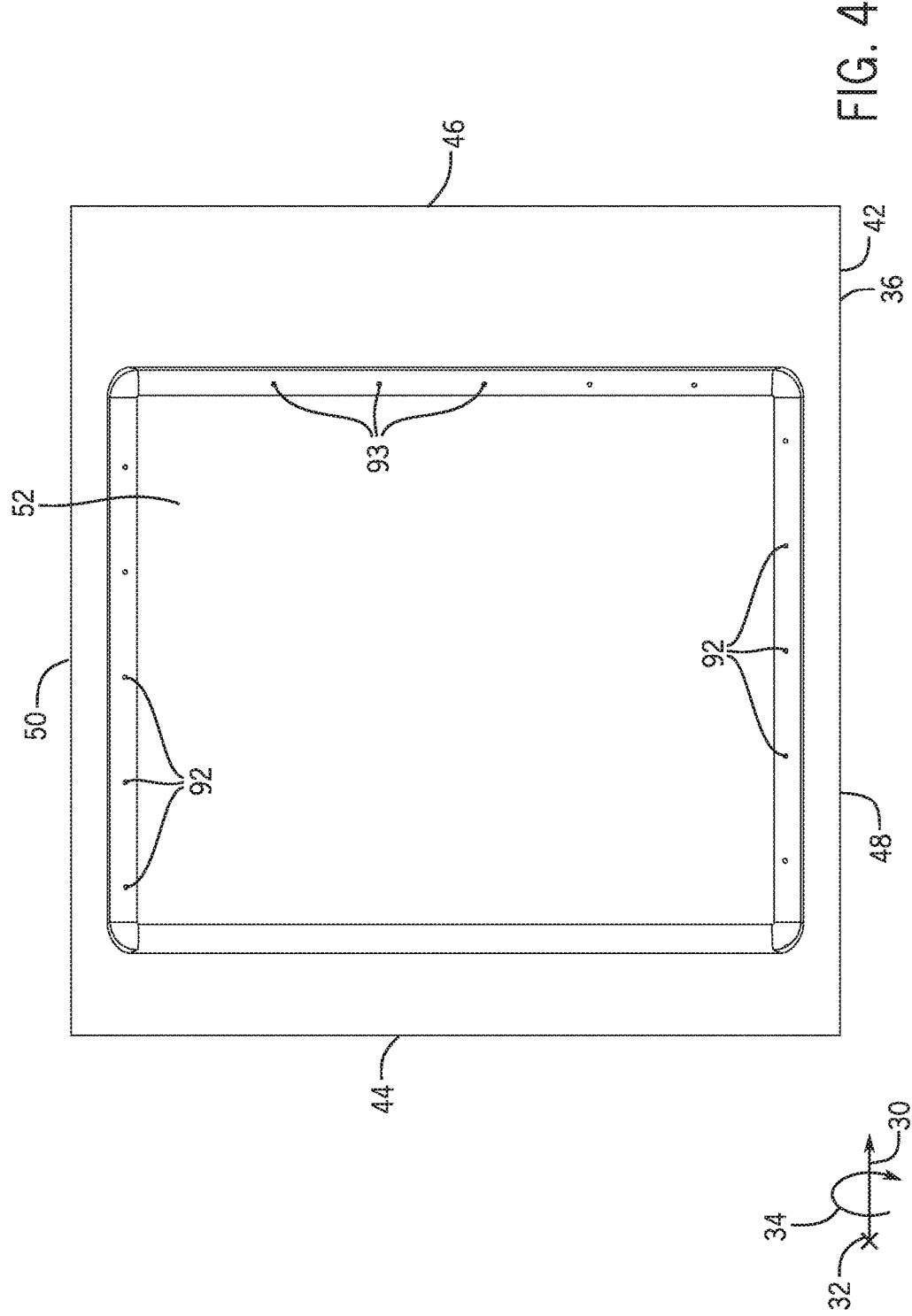
FIG. 4 is a top view (e.g., view of lateral side that interfaces with a cavity) of an embodiment of an inner turbine shroud segment.

FIG. 4 is a top view (e.g., view of the lateral side 52 that interfaces with the cavity 56) of an embodiment of the inner turbine shroud segment 36. As depicted, the body 42 includes a plurality of openings or apertures 92 that enable cooling fluid to flow from the cavity 56 into the channels 74 via inlet passages. The body also includes a plurality of openings or apertures 93 that enable cooling fluid to flow from the cavity 56 into channels (different from channels 74) disposed adjacent the trailing edge 46. In certain embodiments, inlet passages extend generally in the radial direction 32 from the free ends 80 of the hook-shaped portions 78 of the channels 74 to the lateral side 52 to enable the flow of cooling fluid into the channels 74. In certain embodiments, the inlet passages may be angled relative to the lateral side 54. For example, an angle of the inlet passages may range between approximately 45 and 90 degrees, 45 and 70 degrees, 70 and degrees, and all subranges therein.

Figure 5:
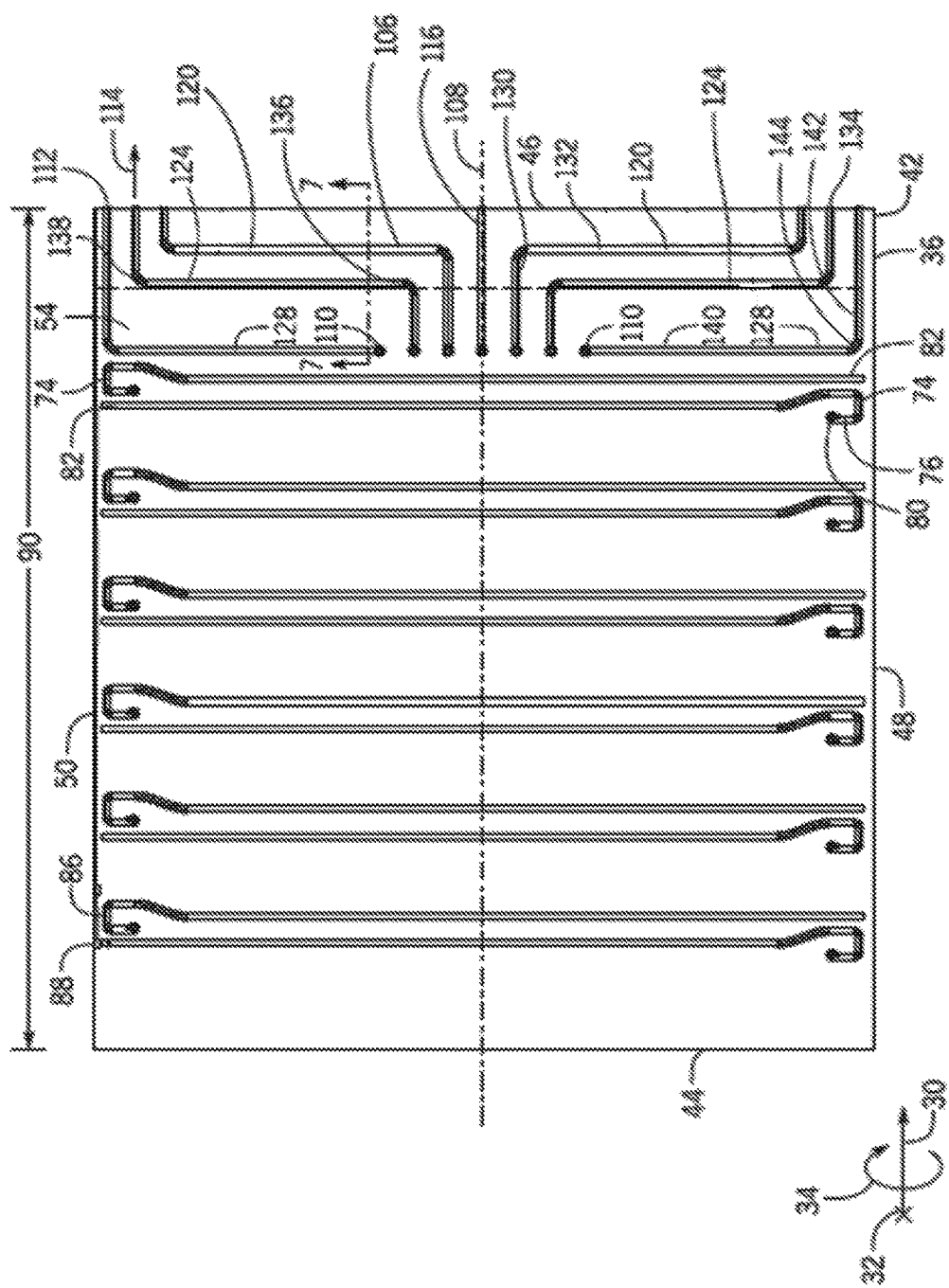
FIG. 5 is a bottom view (e.g., view of lateral side that is oriented toward a hot gas flow path) of an embodiment of an inner turbine shroud segment having cooling channels in a zig-zag arrangement adjacent a trailing edge.

FIG. 5 is a bottom view (e.g., view of the lateral side 54 that is oriented toward the hot gas flow path) of an embodiment of the inner turbine shroud segment 36 (without the PSP layer 58) having cooling channels 106 in a zig-zag arrangement adjacent the trailing edge 46. As depicted, the body 42 includes a plurality of channels 106 (e.g., cooling channels or micro-channels) disposed within the lateral side 54 adjacent the trailing edge 46. The body 42 may include 2 to 30 or more channels 106 (as depicted, the body 42 includes 7 channels 106). The channels 106 are arranged about a central axis 108 of the body 42. Each channel 106 is configured to receive a cooling fluid from the cavity 56 via a first free end 110 and to discharge the spent cooling fluid via a second free end 112 via exit holes at the trailing edge 46 as indicated by arrows 114. In certain embodiments, the channels 106 may include metering features as described above with regard to channels 74. The innermost channel 116 extends in the axial direction 30 along the central axis 108 from upstream of the trailing edge 46 to the trailing edge 46. The channels 106 also include channels 120 flanking the channel 116 channels 124 flanking the channel 116 and the channels 120, and channels 128 flanking the channel 116 and the channels 120 and 124. Each of the channels 120 and 124 includes a first portion 130 having the first free end 110 that extends in the axial direction 30 parallel to the central axis 108 from upstream of the trailing edge 46 towards the trailing edge 46. Each of the channels 120 and 124 also includes a second portion 132 extending perpendicular to and away from the central axis 108 (as well as parallel to the trailing edge 46). Each of the channels 120 and 124 further includes a third portion 134 having the second free end 112 that extends in the axial direction 30 parallel to the central axis 108 from upstream of the trailing edge 46 to the trailing edge 46. Each of the channels 120 and 124 includes a first curved portion 136 coupling the first and second portions 130, 132 and a second curved portion 138 coupling the second and third portions 132, 134. The portions 130 are parallel with respect to each other. Also, the portions 132 are parallel with respect to each other. Further, the portions 134 are parallel with respect to each other. Each of the channels 128 includes a first portion 140 having the first free end 110 extending perpendicular to and away from the central axis 108 (as well as parallel to the trailing edge 46). Each of the channels 128 also includes a second portion 142 having the second free end 112 that extends in the axial direction 30 parallel to the central axis 108 from upstream of the trailing edge 46 to the trailing edge 46. Each of the channels 128 includes a curved portion 144 coupling the first and second portions 140, 142. The portions 140 are parallel with respect to the portions 132. Also the portions 142 are parallel with respect to the portions 130, 134. The entirety of the channels 106 may be disposed within the last approximately 25 percent of the length 90 of the body 42 adjacent the trailing edge 46. In certain embodiments, the channels 106 may be disposed within the last approximately 15 to 25 percent of the length 90 of the body 42 adjacent the trailing edge 46. The channels 106 provide a larger cooling region (e.g., larger than typical cooling systems for turbine shrouds)

adjacent the trailing edge 46 while keeping flow at a minimum. Overall, the shape of the channels 106 is also optimized to provide adequate cooling in the event of plugged channels 106. In certain embodiments, the body 42 may only include the channels 106 (as opposed to both channels 74, 106).

Figure 6:
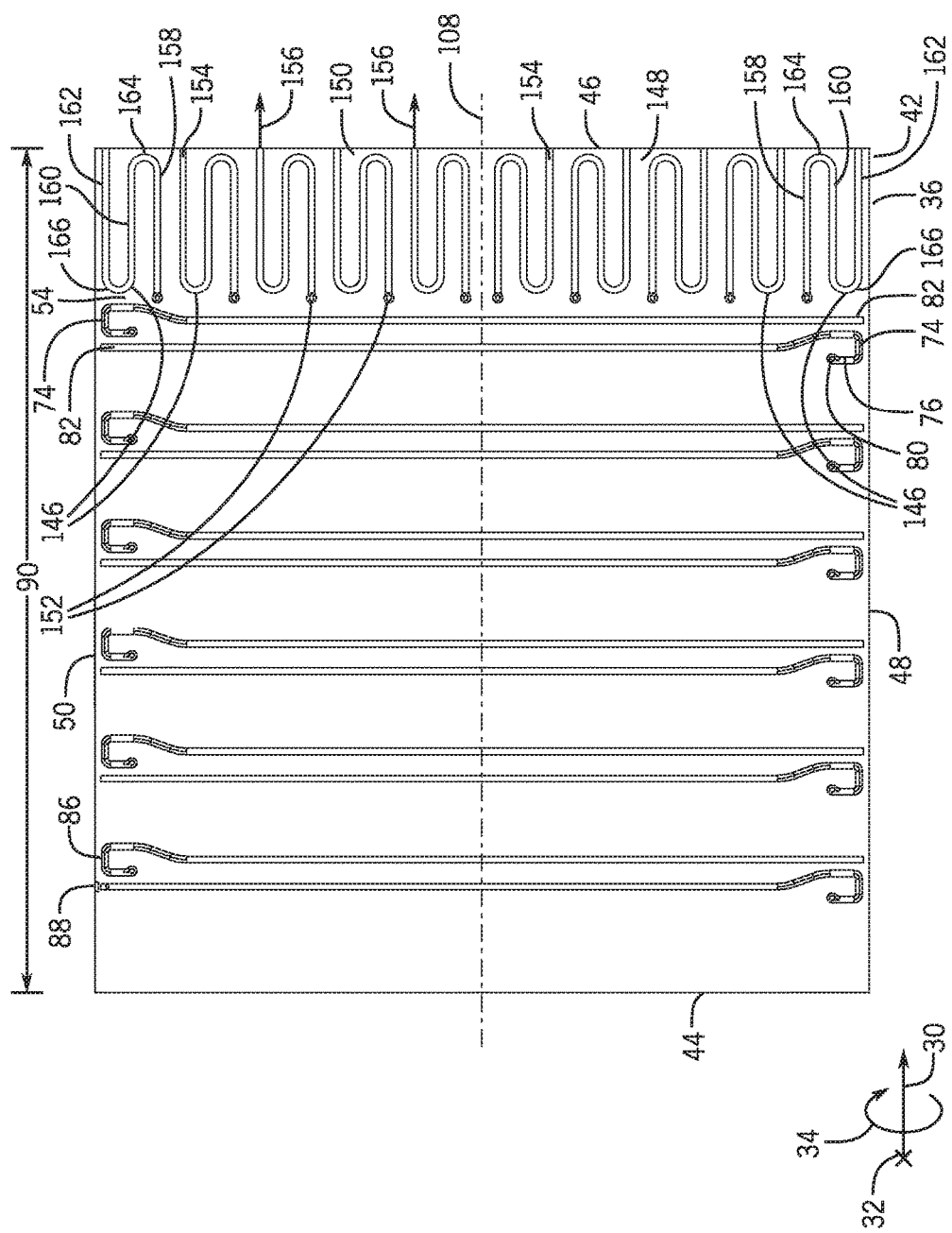
FIG. 6 is a bottom view (e.g., view of lateral side that is oriented toward hot a gas flow path) of an embodiment of an inner turbine shroud segment having cooling channels in a serpentine arrangement adjacent a trailing edge.

FIG. 6 is a bottom view (e.g., view of the lateral side 54 that is oriented toward the hot gas flow path) of an embodiment of the inner turbine shroud segment 36 (without the PSP layer 58) having cooling channels 146 in a serpentine arrangement adjacent the trailing edge 46. As depicted, the body 42 includes a plurality of channels 146 (e.g., cooling channels or micro-channels) disposed within the lateral side 54 adjacent the trailing edge 46. The body 42 may include 2 to 30 or more channels 146 (as depicted, the body 42 includes 10 channels 146). The channels 146 are arranged about a central axis 108 of the body 42. As depicted, the 5 of the channels 146 are disposed on a first side 148 of the central axis 108, while the other 5 channels 146 are disposed on the a second side 150 of the central axis 108 with their orientation flipped 180 degrees with respect to the channels 146 on the first side 148 (e.g., to form a mirror image about the central axis 108). Each channel 146 is configured to receive a cooling fluid from the cavity 56 via a first free end 152 and to discharge the spent cooling fluid via a second free end 154 via exit holes at the trailing edge 46 as indicated by arrows 156. In certain embodiments, the channels 146 may include metering features as described above with regard to channels 74. Each channel 146 includes a first portion 158 having the first the free end 152 that extends in the axial direction 30 parallel to the central axis 108 from upstream of the trailing edge 46 towards the trailing edge 46. Each channel 146 also includes a second portion 160 extending (e.g., parallel to the central axis 108) from adjacent the trailing edge 46 to upstream of the second edge (e.g., opposite direction 30). Each channel 146 further includes a third portion 162 extending in the axial direction 30 parallel to the central axis 108 from upstream of the trailing edge 46 to the trailing edge 46. The first, second, and third portions 158, 160, 162 are parallel with respect to each other. As depicted, the first, second, and third portions 158, 160, 162 are linear. The second portion 160 is disposed between the first and third portions 158, 162. The first portion 158 is located closer to the central axis 108 than the second and third portions 160, 162. Each channel 146 also includes a first curved portion 164 disposed adjacent the trailing edge 46 that couples the first and second portions 160, 162. Each channel 146 further includes a second curved portion 166 disposed upstream of the trailing edge 46 that couples the second and third portions 160, 162. Thus, as depicted, each channel 146 includes serpentine pattern. The entirety of the channels 146 may be disposed within the last approximately 25 percent of the length 90 of the body 42 adjacent the trailing edge 46. In certain embodiments, the channels 146 may be disposed within the last approximately 15 to 25 percent of the length 90 of the body 42 adjacent the trailing edge 46. The channels 146 provide a larger cooling region (e.g., larger than typical cooling systems for turbine shrouds) adjacent the trailing edge 46 while keeping flow at a minimum. Overall, the shape of the channels 146 is also optimized to provide adequate cooling in the event of plugged channels 146. In certain embodiments, the body 42 may only include the channels 146 (as opposed to both channels 74, 146).

Figure 7:
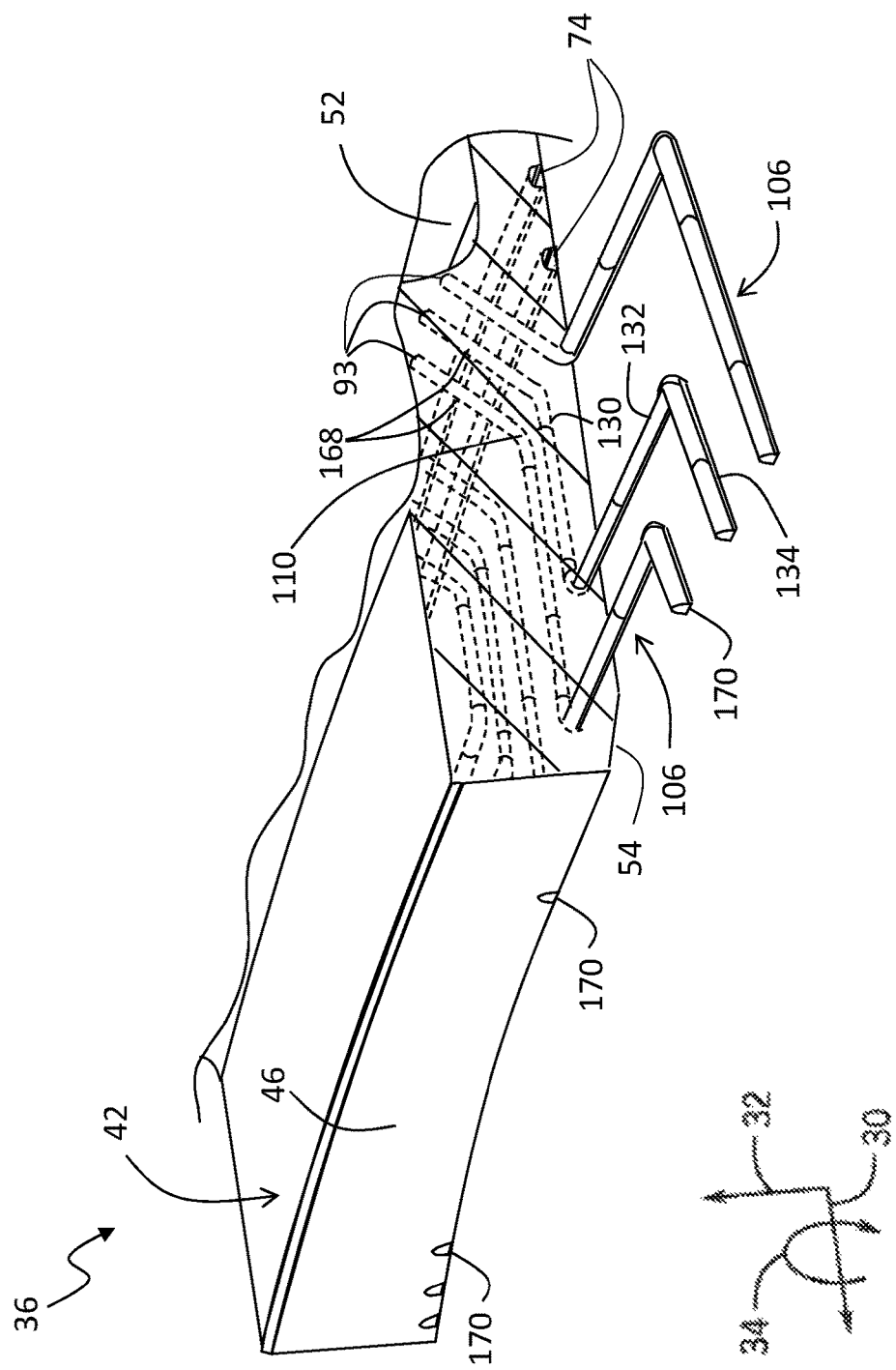
FIG. 7 is a perspective cross-sectional view of an embodiment of a portion of the inner turbine shroud segment of FIG. 5, taken along line 7-7 (with inlet passages and channels shown in dashed lines)

FIG. 7 is a perspective cross-sectional view of an embodiment of a portion of the inner turbine shroud segment 36 of FIG. 5, taken along line 7-7 (with inlet passages 168 and channels 106 shown in dashed lines). As depicted, inlet passages 168 (shown in dashed lines) extend generally in the radial direction 32 from the free ends 110 of the first portions 130, 140 of the channels 106 to the lateral side 52 (e.g., to openings 93) to enable the flow of cooling fluid into the channels 106. The channels 146 (e.g., the free ends 152 of the first portions 158) may also be coupled to inlet passages similar to passages 168. In certain embodiments, the inlet passages 168 may be angled relative to the lateral side 54. For example, an angle of the inlet passages 168 may range between approximately 45 and 90 degrees, 45 and 70 degrees, 70 and degrees, and all subranges therein. Also, depicted in FIG. 7, are the exit holes 170 for the channels 106 (or channels 146) to discharge the spent cooling fluid from the trailing edge 46.

Figure 8:
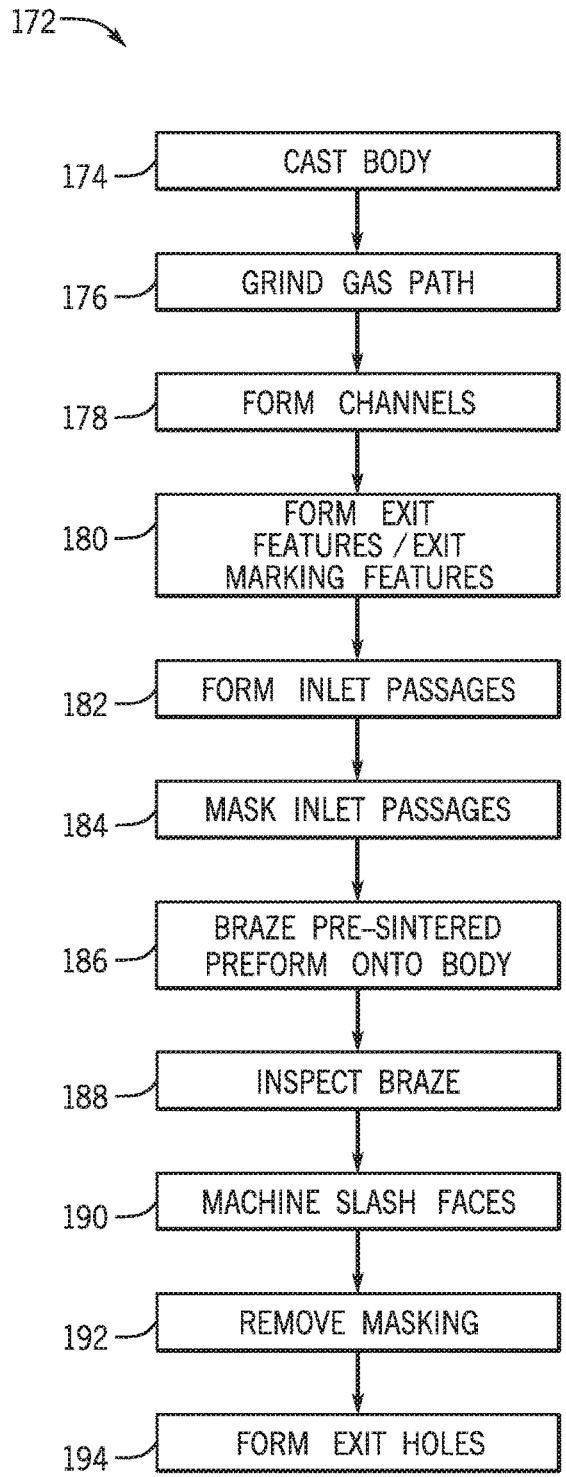
FIG. 8 is a flow chart of an embodiment of a method for manufacturing an inner turbine shroud segment.

FIG. 8 is a flow chart of an embodiment of a method 172 for manufacturing the inner turbine shroud segment 36. The method 172 includes casting the body 42 (block 174). The method 172 also includes grinding a gas path surface onto to the body 42 (block 176). In particular, the lateral side 54 that is configured to be oriented toward the hot gas flow path 47 may be grinded into an arcuate shape in the circumferential direction 34 between the first and second side edges 48, 50 and/or in the axial direction 30 between the leading and trailing edges 44, 46. The method 172 further includes forming (e.g., machining, electrical discharge machining, etc.) the channels 74, 106, 146 into the lateral side 54 of the body 42 (block 178). The method 172 yet further includes forming (e.g., machining, electrical discharge machining, etc.) optionally the exit features or exit marking features that indicate where exits holes should be drilled or electrical discharge machined in the second end portion 82 of the channels 74 (or the portions 134, 162 of the channels 106, 146, respectively) (block 180). The method 172 still further includes forming (e.g., machining, electrical discharge machining, etc.) the inlet passages from the lateral 52 to the free ends 80 of the hook-shaped portions 78 of the first end portions 76 of the channels 74 and/or the inlet passages 168 to the channels 106, 146 (block 182). The method 172 includes masking the openings or apertures 92, 93 of the inlet passages 94, 168 (block 184) to block debris from getting within the channels 74, 106, 146 during manufacture of the inner turbine shroud segment 36. The method 172 includes brazing the PSP layer 58 onto the lateral side 54 (block 186) so that the first surface 60 of the PSP layer 58 together with the body 42 defines (e.g., encloses) the channels 74, 106, 146 and the second surface 62 of the PSP layer 58 interfaces with the hot gas flow path 47. In certain embodiments, as an alternative to the PSP layer 58 a non-PSP metal sheet may be disposed on the lateral side 54 that together with the body 42 defines the channels 74, 106, and 146. In certain embodiments, as an alternative to the PSP layer 58, a barrier coating or TBC bridging may be utilized to enclose the channels 74, 106, 146 within the body 42. The method 172 also includes inspecting the brazing of the PSP layer 58 to the body 42 (block 188). The method 172 yet further includes machining the slash faces (e.g., side edges 48, 50) (block 190). The method 172 still further includes removing the masking from the openings 92, 93 of the inlet passages 94, 168 (block 192). The method 172 even further includes forming (e.g., machining, electrical discharge machining, etc.) the exit holes of the second end portions 82 of the channels 74 to enable the cooling fluid to exit the side edges 48, 50 and/or the exit holes 170 (e.g., exit metering holes) (block 194). In certain embodiments, the channels 74, 106, 146, the metering features, and the inlet passages 94 may be cast within the body 42.

Technical effects of the disclosed embodiments include providing systems and methods for cooling the trailing edge 46 of the inner turbine shroud segment 36. In particular, the inner turbine shroud segment 36 includes near surface micro-channels 146 on the lateral side 54 that are enclosed within the body 42 via the PSP layer 58. The channels 146 include the free ends 110 coupled to inlet passages 168 to enable cooling fluid to flow into the channels 146 to cool the trailing edge 46 of the inner turbine shroud segment 36. The channels 146 also may include a metering feature to regulate the flow of the cooling fluid within the channels 146. The serpentine shape of the channels 146 provide a larger cooling region (e.g., larger than typical cooling systems for turbine shrouds) adjacent the trailing edge 46 while keeping flow at a minimum. The shape of the channels 146 is also optimized to provide adequate cooling in the event of plugged channels 146. The disclosed embodiments of the inner turbine shroud segment 36 may enable cooling of the trailing edge 46 of the inner turbine shroud segment 36 with less air (e.g., than typical cooling systems for turbine shrouds) resulting in reduced costs associated with regards to chargeable air utilized in cooling.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A shroud segment for use in a turbine section of a gas turbine engine, the shroud segment comprising:
  a body including a leading edge, a trailing edge opposite the leading edge, a first side edge, a second side edge opposite the first side edge, and a pair of opposed lateral sides between the leading and trailing edges and the first and second side edges, wherein a first lateral side of the pair of opposed lateral sides is configured to interface with a cavity having a cooling fluid, and a second lateral side of the pair of opposed lateral sides is oriented toward a hot gas flow path;
  a first flow passage extending radially inward from an inlet in the first lateral side; and
  a first channel disposed within the body on the second lateral side adjacent the trailing edge, wherein the first channel comprises a second flow passage in fluid communication with the first flow passage; a third flow passage in fluid communication with the second flow passage; and a fourth flow passage defining an outlet in the trailing edge;
  wherein the second flow passage extends from upstream of the trailing edge towards the trailing edge in a first direction from the leading edge to the trailing edge, the fourth flow passage extends in the first direction from upstream of the trailing edge to the outlet in the trailing edge, and the third flow passage is a single linear passage laterally disposed between the second flow passage and the fourth flow passage and extends in a second direction different from the first direction; and
  wherein the first flow passage and the first channel are configured to convey the cooling fluid from the cavity to the trailing edge to cool the trailing edge.

2. The shroud segment of claim 1, wherein the second and fourth flow passages are linear.

3. The shroud segment of claim 2, wherein the first channel comprises a first curved portion coupling the second flow passage to the third flow passage.

4. The shroud segment of claim 3, wherein the first channel comprises a second curved portion upstream of the trailing edge coupling the single linear portion of the third flow passage to the fourth flow passage including the outlet.

5. The shroud segment of claim 1, wherein the second flow passage, the third flow passage, and the fourth flow passage are parallel with respect to each other, and the first channel is arranged in a serpentine pattern.

6. The shroud segment of claim 1, wherein the first channel is arranged in a zigzag pattern with the single linear portion of the third flow passage being disposed perpendicularly to the second flow passage and the fourth flow passage.

7. The shroud segment of claim 1, wherein the second flow passage is located closer than the third flow passage and the fourth flow passage to a central axis of the body, the central axis extending from the leading edge to the trailing edge.

8. The shroud segment of claim 1, further comprising a fifth flow passage and a second cooling channel, the fifth flow passage extending radially inward from an additional inlet in the first lateral side to the second cooling channel, the second cooling channel being disposed within the body on the second lateral side adjacent the trailing edge, wherein the second cooling channel comprises a sixth flow passage in fluid communication with the fifth flow passage and extending in the second direction and a seventh flow passage extending in the first direction to an additional outlet on the trailing edge; and wherein the sixth flow passage is located closer than the seventh flow passage to the central axis.

9. The shroud segment of claim 1, wherein the first channel is electrical discharge machined into the body.

10. The shroud segment of claim 1, wherein the body has a length from the leading edge to the trailing edge, and the first channel is disposed in its entirety within a last quarter of the length.

11. The shroud segment of claim 1, comprising a pre-sintered preform layer brazed onto the second lateral side, wherein the pre-sintered preform layer comprises a first surface configured to interface with the hot gas flow path and a second surface that together with the body defines the first channel.

12. A gas turbine engine comprising:
  a compressor;
  a combustion system; and
  a turbine section comprising:
    an outer casing;
    an outer shroud segment coupled to the outer casing;
    an inner shroud segment coupled to the outer shroud segment to form a cavity between the outer shroud segment and the inner shroud segment, the cavity being configured to receive a cooling fluid from the compressor, wherein the inner shroud segment comprises:
      a body including a leading edge, a trailing edge opposite the leading edge, a first side edge, a second side edge opposite the first side edge, and a pair of opposed lateral sides between the leading and trailing edges and the first and second side edges, wherein a first lateral side of the pair of opposed lateral sides is configured to interface with the cavity, and a second lateral side of the pair of opposed lateral sides is oriented toward a hot gas flow path;

a plurality of channels disposed within the body, wherein each channel comprises a first flow passage extending radially inward from an inlet in the first lateral side, a second flow passage in fluid communication with the first flow passage, a fourth flow passage parallel to and laterally offset from the second flow passage and defining an outlet, and a third flow passage defining a single linear portion disposed between the second flow passage and the fourth flow passage;

wherein the second flow passage, the third flow passage, and the fourth flow passage are disposed on the second lateral side adjacent the trailing edge;

wherein the second flow passage and the fourth flow passage define cooling flow paths in a first direction, and the third flow passage defines a cooling flow path in a second direction different from the first direction; and wherein the plurality of channels is configured to convey the cooling fluid from the cavity to the trailing edge to cool the trailing edge.

13. The gas turbine engine of claim 12, wherein the body has a length from the leading edge to the trailing edge, and the entirety of the second flow passage, the third flow passage, and the fourth flow passage of each channel are disposed within a last quarter of the length.

14. The gas turbine engine of claim 12, comprising a pre-sintered preform layer brazed onto the second lateral side, wherein the pre-sintered preform layer comprises a first surface configured to interface with the hot gas flow path and a second surface that together with the body defines the second flow passage, the third flow passage, and the fourth flow passage of each respective channel of the plurality of channels.

15. A shroud segment for use in a turbine section of a gas turbine engine, the shroud segment comprising:

a body including a leading edge, a trailing edge, a first side edge, a second side edge, and a pair of opposed lateral sides between the leading and trailing edges and the first and second side edges, wherein a first lateral side of the pair of opposed lateral sides is configured to interface with a cavity having a cooling fluid, and a second lateral side of the pair of opposed lateral sides is oriented toward a hot gas flow path;

a plurality of channels disposed within the body, wherein each channel comprises a first flow passage extending radially inward from an inlet in the first lateral side, a second flow passage in fluid communication with the first flow passage, a fourth flow passage parallel to and laterally spaced from second flow passage and defining an outlet, and a third flow passage defining a single linear portion disposed between the second flow passage and the fourth flow passage; and wherein the second flow passage and the fourth flow passage define cooling flow paths in a first direction, and the third flow passage defines a cooling flow path in a second direction different from the first direction;

wherein the second flow passage, the third flow passage, and the fourth flow passage are disposed on the second lateral side adjacent the trailing edge; and wherein the plurality of channels is configured to convey the cooling fluid from the cavity to the trailing edge to cool the trailing edge.

16. The shroud segment of claim 15, wherein the body has a length from the leading edge to the trailing edge, and the entirety of the second flow passage, the third flow passage, and the fourth flow passage of each channel are disposed within a last quarter of the length.

17. The shroud segment of claim 15, comprising a pre-sintered preform layer brazed onto the second lateral side, wherein the pre-sintered preform layer comprises a first surface configured to interface with the hot gas flow path and a second surface that together with the body defines the second flow passage, the third flow passage, and the fourth flow passage of each respective channel of the plurality of channels.

* * * * *